Jan. 19, 1954  P. W. HARRIS  2,666,896
ELECTRICAL MEANS FOR MEASURING THE THICKNESS
OF ELECTRICALLY NONCONDUCTIVE MATERIAL
Filed Feb. 7, 1951  2 Sheets-Sheet 2

Inventor
P. W. Harris
By Herrick Downing Nuble
Attys.

Patented Jan. 19, 1954

2,666,896

UNITED STATES PATENT OFFICE 2,666,896

ELECTRICAL MEANS FOR MEASURING THE THICKNESS OF AN ELECTRICALLY NON-CONDUCTIVE MATERIAL

Percy William Harris, Shirley, Birmingham, England, assignor to M. P. J. Gauge & Tool Company Limited, Erdington, Birmingham, England Application February 7, 1951, Serial No. 209,772

Claims priority, application Great Britain February 24, 1950

2 Claims. (Cl. 324—61)

This invention has for its object to provide electrical means for measuring the thickness of electrically non-conductive materials, such as a thin surface covering on a metal article and made from, for example, vitreous or other enamel or varnish, or such material in thin sheet or strip form.

The invention consists in a gauge for measuring the thickness of electrically non-conducting material comprising, a first thermionic valve oscillator the frequency of oscillation of which is fixed, a second thermionic valve oscillator the frequency of which is variable manually so as to be capable of being adjusted to the same frequency of oscillation as that of the first oscillator, a circuit including an indicating device coupled to both oscillators to indicate when the oscillators are oscillating at the same frequency and to what extent they differ when they differ in frequency, a standard condenser, means for connecting to and disconnecting the standard condenser from the second oscillator to change its frequency of oscillation by a predetermined amount, and an electrode connected to said second oscillator, which, when brought in contact with the material to be measured, the other side of the material being in contact with an earthed metallic surface, changes the frequency of the second oscillator, the extent of change of said frequency being compared with that produced by the standard condenser to determine the thickness of the material, the standard condenser and means for connecting to and disconnecting from the standard condenser being mounted adjacent to the electrode in a manually supportable detector head.

Figure 1:
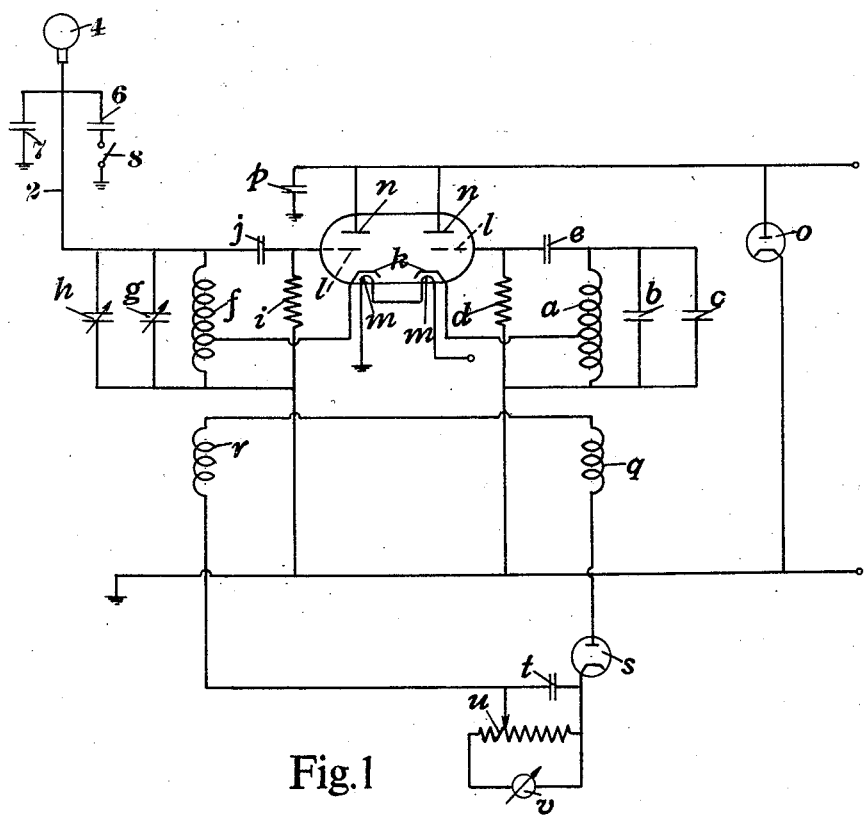
Figure 1 is a diagram illustrating the arrangement of electrical components in an apparatus embodying the invention.

Referring to Figure 1, the arrangement there shown comprises a pair of balanced oscillators of the kind known as Hartley oscillators. The oscillator at the right-hand side of the diagram includes an inductance $a$ and a condenser $b$. It also includes a temperature-compensating condenser $c$ of known form for nullifying any adverse effect of temperature variation in the balance of the bridge. Further it includes a self-biasing resistance $d$ and condenser $e$.

The oscillator shown at the left-hand side of the diagram is essentially similar to that shown at the right hand side, and includes an inductance $f$, a variable condenser $g$, a variable trimming condenser $h$ and a self-biasing resistance $i$ and condenser $j$, the temperature-compensating condenser being incorporated in the detector head to be hereinafter described.

In the example shown in Figure 1, the two oscillators are in the form of a double-triode valve of, for example, the type known as 6SN7. Alternatively two single triode valves may be used. As shown in the diagram, the cathodes of the valve are indicated by $k$, the grids by $l$, the cathode heaters by $m$ and the anodes by $n$, the cathodes being connected to intermediate parts of the inductances $a$, $f$, and the oscillator circuits being connected to the grids. The high tension voltage may be provided from a source of direct current or alternatively from an alternating current supply after rectification. The condenser $p$ is to by-pass the high frequency oscillations while the neon tube $o$ is to stabilise the high tension voltage.

In association with the oscillators is provided an arrangement which includes a pair of inductances $q$, $r$, respectively coupled to the inductances $a$, $f$, a rectifier $s$ and condenser $t$. Also the condenser $t$ and rectifier $s$ are connected to a variable potentiometer $u$ across the ends of which is connected an indicating instrument $v$ of the voltmeter or other convenient type, the latter being graduated to give a direct reading of the thickness of the material to be measured.

Figure 2:
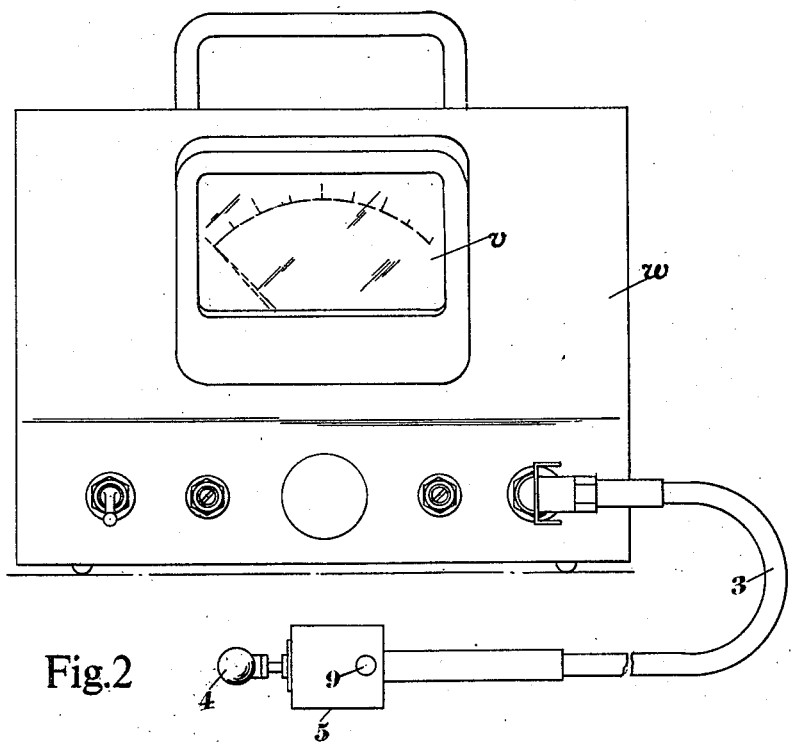
Figure 2 is a front elevation of a convenient form of apparatus embodying the arrangement shown in Figure 1.

In one example of apparatus embodying the invention, the whole of the arrangement above described is contained in a casing $w$ as shown in Figure 2, and the left-hand oscillator shown in Figure 1 is connected by a conductor 2 (Figure 1) to the detector head. This conductor consists of a length of flexible cable which is enclosed by a flexible metal sheath 3 (Figure 2).

Figure 3:
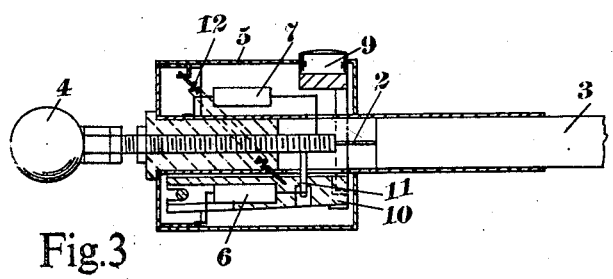
Figure 3 is a sectional side elevation.
Figure 4:
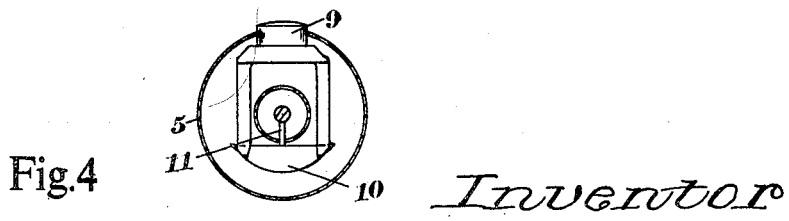
Figure 4 is a cross section of the detector head forming part of the apparatus shown in Figure 2.

The detector head in this example comprises a metal knob 4 of spherical form adapted to be held by hand in contact with the material, whose thickness is to be measured, and in combination with the detector head is provided a housing 5 which contains a condenser 6, and the temperature-compensating condenser 7 corresponding to the condenser c shown in the right hand oscillator of Figure 1. The condenser 6 has a capacity of approximately the same order as that of the material to be measured, and corresponding to a thickness of, for example, about 0.020 inch. When dealing with a range of different materials, a corresponding range of different condensers 6 may be provided, the appropriate condenser being inserted in the head when dealing with materials of the same kind. The condenser 6 is controlled by a switch 8 (Figure 1). This switch comprises a push button 9 (Figures 3–5), a lever 10, and contact piece 11 by which the side of the condenser 6 can be electrically connected to the conductor 2, the lever 10 being loaded by a spring 12.

The mode of use is as follows:

Assuming that the apparatus is in the energised condition, the operative first holds the detector head in his hand, with the switch 8 closed. If the oscillators are in a perfect state of balance no indication will be shown in the ammeter v. Otherwise, an indication will be given. In either case, the operative will then adjust the condensers, g, h to bring the ammeter index finger to a mid or other convenient position on the scale. Having made this initial adjustment, the operative then opens the switch 8 and places the detector head in contact with the material to be measured. If the material consists of a vitreous enamel or other electrically non-conductive coating in a metal sheet, the metal part of the sheet is supported on an earthed table or other support. If the material is in the form of a thin sheet or strip, this is placed on an earthed table when making the measurement. The material now takes the place of the condenser 6, and the resulting indicator on the ammeter gives the required measurement.

The invention is not, however, restricted to the example above described. Thus, for some purposes the detector head may be in the form of a flat plate which is rigidly incorporated with the casing containing the oscillator system, the whole being arranged in a compact form which can be placed on the material to be measured. In this example, the indicating instrument is connected to the oscillator system by a flexible cable and can be located in any desired fixed position.

By this invention the thickness of an electrically non-conductive surface layer or coating on a metal article, or the thickness of a sheet or strip of non-conductive material, can be measured in a convenient and reliable manner.

Having thus described my invention what I claim as new and desire to secure by Letters Patent is:

1. Gauge for measuring the thickness of electrically non-conducting material comprising, a first thermionic valve oscillator, the frequency of oscillation of which is fixed, a second thermionic valve oscillator the frequency of which is variable manually so as to be capable of being adjusted to the same frequency of oscillation as that of the first oscillator, a circuit including an indicating device coupled to both oscillators to indicate when the oscillators are oscillating at the same frequency and to what extent they differ when they differ in frequency, a standard condenser, means for connecting to and disconnecting the standard condenser from the second oscillator to change its frequency of oscillation by a predetermined amount, and an electrode connected to said second oscillator, which, when brought in contact with the material to be measured, the other side of the material being in contact with an earthed metallic surface, changes the frequency of the second oscillator, the extent of change of said frequency being compared with that produced by the standard condenser to determine the thickness of the material, the standard condenser and means for connecting to and disconnecting the standard condenser being mounted adjacent the electrode in a manually supportable detector head.

2. Gauge for measuring the thickness of electrically non-conducting material as claimed in claim 1 in which the said circuit includes a rectifier, an indicating meter and a potentiometer by means of which the position of the needle on the meter may be adjusted as to position on a calibrated dial.

PERCY WILLIAM HARRIS.

References Cited in the file of this patent

UNITED STATES PATENTS

| Number | Name | Date |
|---|---|---|
| 1,822,604 | Simons et al. | Sept. 8, 1931 |
| 1,878,109 | Clark | Sept. 20, 1932 |
| 2,076,944 | Howe | Apr. 13, 1937 |
| 2,241,190 | Fenning | May 6, 1941 |
| 2,285,152 | Firestone | June 2, 1942 |
| 2,485,579 | Elliott | Oct. 25, 1949 |
| 2,601,649 | Wadman | June 24, 1952 |
| 2,613,249 | Babb | Oct. 7, 1952 |

FOREIGN PATENTS

| Number | Country | Date |
|---|---|---|
| 524,510 | Germany | May 8, 1921 |